(12) United States Patent
Tabata et al.

(10) Patent No.: US 7,539,342 B2
(45) Date of Patent: May 26, 2009

(54) IMAGE CORRECTION APPARATUS

(75) Inventors: Naohiro Tabata, Kyoto (JP); Yoko Yoshida, Kyoto (JP)

(73) Assignee: Omron Corporation, Kyoto (JP)

( * ) Notice: Subject to any disclaimer, the term of this patent is extended or adjusted under 35 U.S.C. 154(b) by 661 days.

(21) Appl. No.: 11/127,109

(22) Filed: May 12, 2005

(65) Prior Publication Data
US 2005/0271295 A1 Dec. 8, 2005

(30) Foreign Application Priority Data
May 13, 2004 (JP) ............................. 2004-143297

(51) Int. Cl.
G06K 9/00 (2006.01)
G06K 9/40 (2006.01)
G03F 3/08 (2006.01)

(52) U.S. Cl. ..................... 382/167; 382/274; 358/518

(58) Field of Classification Search ............... 382/162, 382/167, 254, 274, 275; 345/589; 358/518, 358/520
See application file for complete search history.

(56) References Cited

U.S. PATENT DOCUMENTS

| | | | | |
|---|---|---|---|---|
| 6,009,209 A | * | 12/1999 | Acker et al. | ............... 382/275 |
| 6,151,403 A | * | 11/2000 | Luo | ............... 382/117 |
| 6,198,844 B1 | * | 3/2001 | Nomura | ............... 382/168 |
| 6,252,976 B1 | * | 6/2001 | Schildkraut et al. | ......... 382/117 |
| 6,631,208 B1 | | 10/2003 | Kinjo et al. | |
| 7,127,108 B2 | | 10/2006 | Kinjo et al. | |
| 7,155,058 B2 | * | 12/2006 | Gaubatz et al. | ............ 382/167 |
| 7,227,977 B1 | * | 6/2007 | Dotsenko | ................... 382/118 |
| 7,330,287 B2 | * | 2/2008 | Sharman | ................... 358/1.9 |
| 7,343,028 B2 | * | 3/2008 | Ioffe et al. | .................. 382/118 |

(Continued)

FOREIGN PATENT DOCUMENTS

EP     1 357 515 A     10/2003

(Continued)

OTHER PUBLICATIONS

Kawata et al. ("3-D Image Reconstruction with Veiling Glare Correction to Improve the Contrast of 3-D Reconstructed Vascular Images," IEEE Tran. Nuclear Science, V. 43, No. 1, Feb. 1996, pp. 304-309).*

(Continued)

Primary Examiner—Yubin Hung
(74) Attorney, Agent, or Firm—Dickstein Shapiro LLP

(57) ABSTRACT

An object of the invention is to provide an apparatus which performs correction only to a high-brightness portion generated in a particular region, in which a decrease in brightness is necessary, and glaze is removed or reduced. A correction process in which the brightness or the lightness is decreased is simply performed to a pixel in which the brightness or the lightness is high, but a predetermined region (for example, face, eyes, and mouth) of a subject is detected and a degree of correction of each pixel is determined based on the detection result (a position and a color of the predetermined region). Therefore, the region in which the decrease in brightness is not necessary is maintained at high brightness, and the image correction is performed only to the region in which the decrease in brightness is necessary (for example, the region in which the glaze of a skin is generated).

18 Claims, 12 Drawing Sheets

U.S. PATENT DOCUMENTS

| | | |
|---|---|---|
| 7,386,170 B2 * 6/2008 | Ronk et al. | 382/190 |
| 2002/0081003 A1 6/2002 | Sobol | |
| 2003/0198367 A1 10/2003 | Hartmann et al. | |
| 2003/0223622 A1 12/2003 | Simon et al. | |
| 2004/0213476 A1 * 10/2004 | Luo et al. | 382/254 |
| 2005/0074179 A1 * 4/2005 | Wilensky | 382/254 |
| 2005/0232481 A1 * 10/2005 | Wu | 382/167 |

FOREIGN PATENT DOCUMENTS

EP  1 372 109 A  12/2003

JP  2000-76427  3/2000

OTHER PUBLICATIONS

Kawata et al. ("3-D Image Reconstruction with Veiling Glare Correction to Improve the Contrast of 3-D Reconstructed Vascular Images," IEEE Tran. Nuclear Science, V. 43, No. 1, Feb. 1996, pp. 304-309).*

* cited by examiner

IMAGE CORRECTION APPARATUS

BACKGROUND OF THE INVENTION

1. Field of the Invention

The present invention relates to an effective technology which is applied to image correction to a taken image, particularly to the taken image in which a subject is a person.

2. Description of the Background Art

Conventionally, in the image in which the person is taken, there is a problem that the so-called "glaze" is generated. The glaze means that a part of skin is taken in white because light of a stroboscope and the like emitted in taking a photograph is reflected from surface of the skin of the subject person. Therefore, a region in which the glaze is generated (hereinafter referred to as "glaze region") is taken in higher brightness when compared with surrounding skin. Such the glaze gives discomfort impression to a person who sees the image. Therefore, the technology which removes or reduces the glaze is required in the image in which the glaze has been generated.

Conventionally a correction method, in which an operator finds a high-brightness region by visual inspection and the glaze is suppressed by manually reducing the brightness or lightness of the high-brightness region using photo-retouching software and the like, is realized for the demand of the technology which removes or reduces the glaze.

A technology, in which the domain including eyes of the subject person is selected from the image to recognize the high-brightness region in the selected domain and the recognized high-brightness region is painted in based on pixel values on the periphery of the high-brightness region, is also proposed (see Japanese Unexamined Patent Publication No. 2002-269545).

However, when a process of unconditionally decreasing the brightness is performed to the high-brightness region in the image like the conventional technology, there is a possibility that the process of decreasing the brightness is performed to the high-brightness region (for example, the high-brightness regions except for the skin) where the decrease in brightness is not intrinsically required. Specific examples of the high-brightness regions except for the skin include gloss of hair, gloss of a lip, and brightness of a pupil. Contrary to the glaze, the high-brightness regions except for the skin give the good impression to the person who sees the image, particularly when the subject is a woman. Accordingly, in the high-brightness regions, it is not necessary that the brightness is decreased. The above problem cannot be solved even by the method of selecting the domain including the eyes of the subject person from the image.

In view of the foregoing, an object of the invention is to provide an apparatus which solves the above problems to remove or reduce the glaze by performing correction only to a particular region in which the decrease in brightness is necessary.

SUMMARY OF THE INVENTION

In order to solve the above problem, the invention has the following configuration. A first mode of the invention is an image correction apparatus, and the image correction apparatus includes a detection device, a domain determination device, and a correction device. The detection device detects a predetermined region of a subject from an inputted image. The predetermined region of the subject particularly means body regions of the person such as a face, eyes, a mouth, a nose, nares, an outline of the face, a forehead, ears, and a cheek of the person. The domain determination device determines a domain, where image correction is performed, based on a position of the detected predetermined region and brightness or lightness of each pixel of the inputted image. The correction device performs the image correction to the pixel included in the determined domain such that the brightness or the lightness of the pixel is decreased. At this point, the image correction in which the brightness or the lightness is decreased shall include not only the correction process in which the brightness or the lightness of the pixel is decreased, but also the correction process in which the brightness or the lightness is substantially decreased by adjusting a color component such that a red component of the image is increased.

In the first mode of the invention, the domain in which the brightness or the lightness is higher is not simply specified as the target domain in which the brightness or the lightness is decreased, but the domain in which the brightness or the lightness is higher is specified within the domain which is included in the predetermined region of the subject. The image correction, in which the brightness or the lightness is decreased, is performed only to the specified domain. Therefore, the domain in which the decrease in brightness is not necessary can be maintained at high brightness. Namely, the glaze can be removed or reduced by performing the correction only to high-brightness portion generated in the particular region in which the decrease in brightness is necessary.

A second mode of the invention is an image correction apparatus, and the image correction apparatus includes a detection device, an intensity value computing device, and a correction device. As with the detection device in the first mode, the detection device detects a predetermined region of a subject from an inputted image. The intensity value computing device computes an intensity value indicating how much a color component of the pixel is close to a color component which is a dominant in the detected predetermined region. The correction device performs the image correction to each pixel such that the brightness or the lightness of the pixel is decreased. At this point, the correction device performs the above image correction by determining a degree of correction performed to each pixel based on the intensity value and the brightness or the lightness of each pixel of the inputted image. The degree of correction means a degree of the decrease in brightness or lightness, a change amount or a change rate of color components (for example, R, G, and B or L, a, and b components), and the like.

In the second mode of the invention, the degree of correction performed to each pixel is determined according to how much the color component of each pixel is close to the color component which is a dominant to the predetermined region. Therefore, for example, the color component which is a dominant to the predetermined region is designed to become the skin color of the subject, which allows the correction to be performed according to the skin color of the subject. In this case, the degree of correction can be set larger in the portion which is the skin color of the subject, and the degree of correction can be set so as to be suppressed to a small amount in the portion which is not the skin color of the subject. Accordingly, only the glaze generated in the skin of the subject can be removed or reduced, and the brightness generated in the domains except for the skin can be maintained.

It is possible that the correction device in the second mode of the invention weakens the degree of correction to compute the color component close to the color component of the pixel of the inputted image, as the intensity value in each pixel indicates farther away from the color component which is the dominant in the predetermined region, or as the brightness or the lightness of the pixel has a lower value, the color component close to the color component of the pixel being a new color component of the pixel; and the correction device strengthens the degree of correction to compute the color component in which the brightness or the lightness is decreased, as the intensity value in each pixel indicates closer to the color component which is the dominant in the predetermined region, and as the brightness or the lightness of the pixel has a higher value, the color component in which the brightness or the lightness is decreased being a new color component of the pixel.

Generally the color component which is the dominant in the face, the nose, the cheek, the forehead, and the like (examples of the predetermined region) becomes the skin color of the person. Therefore, the correction device is configured in the above-described manner and the correction device is configured to detect the region in which the skin color of the person becomes the main color component, which allows the degree of correction to be strengthened to the region having the color close to the skin color of the person in which the brightness or the lightness is higher (for example, the glaze portion of the skin). In this case, the degree of correction is weakened to the region having the color different from the skin color of the person. Accordingly, loss of the brightness can be prevented or decreased in the region having the color different from the skin color of the person. Further, the invention can be applied to various races whose skin colors are different from one another.

It is possible that an image correction apparatus in the second mode of the invention further includes a blurring device which performs a blurring process to the inputted image. In this case, the correction device weakens the degree of correction to compute the color component close to the color component of the pixel of the inputted image, as the intensity value in each pixel indicates farther away from the color component which is the dominant in the predetermined region, or as the brightness or the lightness of the pixel has a lower value, the color component closer to the color component of the pixel being a new color component of the pixel; and the correction device strengthens the degree of correction to compute the color component close to the color component in the case where the blurring process is performed, as the intensity value in each pixel indicates closer to the color component which is the dominant in the predetermined region, and as the brightness or the lightness of the pixel has a higher value, the color component in the case where the blurring process is performed being a new color component of the pixel.

Accordingly, when the correction is strengthened, the color component close to the color component in the case where the blurring process is performed to the inputted image is computed as the post-correction pixel. Namely, the image correction is performed by using the color component in which the brightness or the lightness is suppressed to a certain degree by the blurring process. Therefore, the natural correction can be realized with no feeling that something is wrong.

It is possible that the blurring device in the second mode of the invention performs the blurring process by using only the pixel having a value indicating that the intensity value is close to the color component which is the dominant in the predetermined region. Accordingly, when the color component which is the dominant in the predetermined region is the skin color, the blurring process is not used for the colors of the portions which are not the skin color like the hair (for example, hair of a head, hair of an eyebrow, hair of a tendon, and a beard), the pupil, the nares, and the lip. Therefore, each pixel value obtained by the blurring process becomes the value obtained only by the skin color itself or the color component close to the skin color, and each pixel value obtained by the blurring process is not affected by the color components except for the skin color. As a result, the post-correction skin portion is not affected by the colors of the portions except for the skin color portion, and the natural correction can be realized with no feeling that something is wrong.

A third mode of the invention is an image correction apparatus, and the image correction apparatus includes a detection device and a correction device. As with the detection device in the first mode, the detection device detects a predetermined region of a subject from an inputted image. The correction device performs image correction to each pixel such that brightness or lightness of the pixel is decreased. At this point, the correction device determines a degree of correction performed to each pixel based on a position of the detected predetermined region and the brightness or the lightness of each pixel of the inputted image.

In the third mode of the invention, for example, it is possible that the degree of correction is determined based on the brightness or the lightness only to the pixel located in the domain of a predetermined pattern whose position is determined based on the position of the detected predetermined region. Therefore, the third mode of the invention can also obtain the same effect as for the first mode of the invention. Further, in the third mode of the invention, it is possible that the degree of correction performed is determined based on a direction and a distance between the position of each pixel and the position of at least one point, determined based on the position of the detected predetermined region, and the brightness or the lightness of the pixel. Therefore, according to the third mode of the invention, the degree of correction can be adjusted according to the position of each pixel, and the image correction can be realized more naturally.

A fourth mode of the invention is an image correction apparatus, and the image correction apparatus includes a detection device, an intensity value computing device, and a correction device. As with the detection device in the first mode, the detection device detects a predetermined region of a subject from an inputted image. As with the intensity value computing device in the second mode, the intensity value computing device computes an intensity value indicating how much a color component of the pixel is close to a color component which is a dominant in the detected predetermined region. The correction device performs image correction to each pixel such that brightness or lightness of the pixel is decreased. At this point, the correction device determines a degree of correction performed to each pixel based on the intensity value and the brightness or the lightness of each pixel of the inputted image. In the fourth mode of the invention having the above-described configuration, the degree of correction is determined based on not only the intensity value and the brightness or the lightness of each pixel but also the position of the detected predetermined region. Accordingly, the correction process can more appropriately be performed to each pixel.

It is possible that the correction device in the fourth mode of the invention weakens the degree of correction to compute the color component close to the color component of the pixel of the inputted image, as the intensity value in each pixel indicates farther away from the color component which is the dominant in the predetermined region, or as the brightness or the lightness of the pixel has a lower value, the color component close to the color component of the pixel being a new color component of the pixel; and the correction device strengthens the degree of correction to compute the color component in which the brightness or the lightness is decreased, as the intensity value in each pixel indicates closer to the color component which is the dominant in the predetermined region, and as the brightness or the lightness of the pixel has a higher value, the color component in which the brightness or the lightness is decreased being a new color component of the pixel.

It is possible that an image correction apparatus in the fourth mode of the invention further includes a blurring device which performs a blurring process to the inputted image. In this case, the correction device weakens the degree of correction to compute the color component close to the color component of the pixel of the inputted image, as the intensity value in each pixel indicates farther away from the color component which is the dominant in the predetermined region, or as the brightness or the lightness of the pixel has a lower value, the color component closer to the color component of the pixel being a new color component of the pixel; and the correction device strengthens the degree of correction to compute the color component close to the color component in the case where the blurring process is performed, as the intensity value in each pixel indicates closer to the color component which is the dominant in the predetermined region, and as the brightness or the lightness of the pixel has a higher value, the color component in the case where the blurring process is performed being a new color component of the pixel.

Accordingly, when the correction is strengthened, the color component close to the color component in the case where the blurring process is performed to the inputted image is computed as the post-correction pixel. Namely, the image correction is performed by using the color component in which the brightness or the lightness is suppressed to a certain degree by the blurring process. Therefore, the natural correction can be realized with no feeling that something is wrong.

It is possible that the blurring device in the fourth mode of the invention performs the blurring process by using only the pixel having a value indicating that the intensity value is close to the color component which is the dominant in the predetermined region.

Accordingly, when the color component which is the dominant in the predetermined region is the skin color, the blurring process is not used for the colors of the portions which are not the skin color like the hair (for example, the hair of the head, the hair of the eyebrow, the hair of the tendon, and the beard), the pupil, the nares, and the lip. Therefore, each pixel value obtained by the blurring process becomes the value obtained only by the skin color itself or the color component close to the skin color, and each pixel value obtained by the blurring process is not affected by the color components except for the skin color. As a result, the post-correction skin portion is not affected by the colors of the portions except for the skin color portion, and the natural correction can be realized with no feeling that something is wrong.

It is possible that the correction device in the third mode or the fourth mode determines an estimated domain where a person face is included based on the position of the detected predetermined region and the correction device performs the image correction to the pixel included in the domain based on the brightness or the lightness of each pixel. The above configuration enables the image correction in which the brightness or the lightness is unnecessarily decreased to be performed to the regions except for the person face. Accordingly, the performance of the image correction in which the brightness or the lightness is unnecessarily decreased can be prevented to the region (for example, the hair and jewelry) except for the person face, which should have the high brightness or the high lightness. As a result, the image correction can be prevented from obtaining the unnatural image.

It is possible that the correction device in the third mode or the fourth mode determines an estimated domain where a skin of a person face is generated based on the position of the detected predetermined region and the correction device performs the image correction to the pixel included in the domain based on the brightness or the lightness of each pixel. The above configuration enables the performance the image correction in which the brightness or the lightness is unnecessarily decreased to be prevented to the estimated domain in which the glaze is not generated in the face skin of the person. Therefore, the losses of the brightness of the pupil, the brightness of the hairs and the brightness of the lip due to the image correction can be prevented.

It is possible that the correction device in the third mode or the fourth mode estimates a position of eyes and/or mouth based on the position of the detected predetermined region and the correction device performs the image correction to the pixel in the domains except for the eyes and/or mouth based on the brightness or the lightness of each pixel. The above configuration enables the performance of the image correction in which the brightness or the lightness is unnecessarily decreased to be prevented to the regions of the person eyes and/or the mouth. Therefore, the losses of the brightness of the pupil and the brightness of the hair due to the image correction can be prevented.

It is possible that the correction device in the second mode, the third mode, or the fourth mode obtains the degree of correction in each pixel as a numerical value and the correction device performs the correction process based on a numerical value obtained by performing a smoothing process to the numerical value which is obtained as the degree of correction in each pixel.

Conventionally, since the process of simply decreasing the brightness is performed to the pixel having the high brightness, there are the problems that the impression in which only the domain becomes dark when compared with the surroundings is given to the person who sees the image and the post-correction image becomes unnatural. In order to solve the problems, there is proposed the method, in which not only the glaze region but also the brightness of the whole image are decreased according to the glaze region. However, in the conventional method, there is the problem that not only the high-brightness region where the decrease in brightness is not intrinsically required but also the region which is not originally high-brightness region is decreased in the brightness and the subject face or the whole of the background becomes dark.

In order to solve the above problems, in the correction device in the second mode, the third mode, or the fourth mode, the smoothing process is performed to the value indicating the degree of correction. Therefore, the correction in which only a certain domain is extremely corrected compared with the surroundings can be prevented, and the image correction can be realized more naturally.

It is possible that the first to fourth modes are realized such that programs are executed by an information processing apparatus. Namely, in the invention, the process performed by the devices in the first to fourth modes can be determined as the program executed by the information processing apparatus or a recording medium in which the program is stored. It is possible that the invention is determined by a method in which the information processing apparatus executes the process.

According to the invention, the domain in which the brightness or the lightness is high is not simply specified as the target domain in which the brightness or the lightness is decreased, but whether the correction is performed or not or the degree of correction is determined according to the position and the color component (specifically, whether the color component of each pixel is close to the color component which is the dominant to the detected predetermined region or not) of each pixel. The image correction is performed according to the determination result so that the brightness or the lightness is decreased. Accordingly, the region in which the decrease in brightness is not necessary (for example, the hair, the pupil, and the lip) can be maintained at high brightness. In other words, the correction is performed only to the high-brightness portion generated in the particular region in which the decrease in brightness is necessary, and the glaze can be removed or reduced.

DETAILED DESCRIPTION OF THE PREFERRED EMBODIMENTS

System Configuration

First a system configuration of an image correction apparatus 1 will be described. Form a viewpoint of hardware, the image correction apparatus 1 includes CPU (Central Processing Unit), a main storage unit (RAM), and an auxiliary storage unit. The auxiliary storage unit is formed by using a non-volatile storage unit. As used herein, the term of non-volatile storage unit shall mean the so-called ROM (Read-Only Memory; including EPROM (Erasable Programmable Read-Only Memory) and mask ROM), a hard disk drive, and the like.

Figure 1:
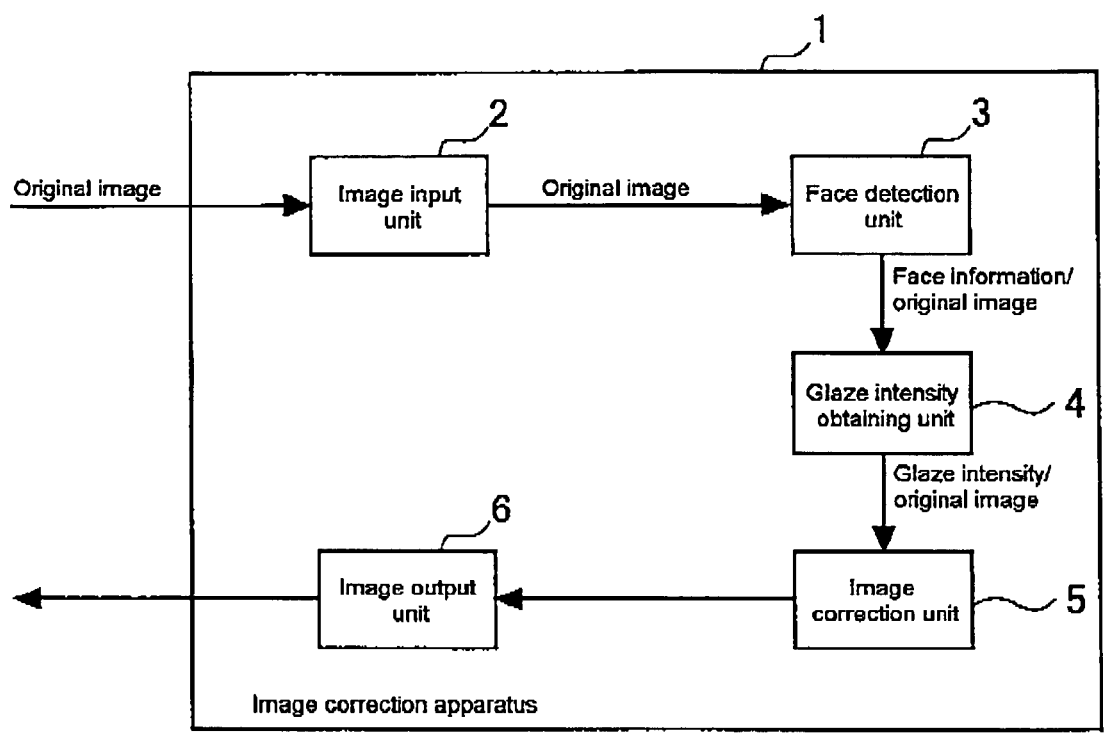
FIG. 1 shows an example of a function block of an image correction apparatus.

FIG. 1 shows an example of a function block of the image correction apparatus 1. The image correction apparatus 1 includes the image input unit 2, the face detection unit 3, the glaze intensity obtaining unit 4, the image correction unit 5, and the image output unit 6. The functions of the image correction apparatus 1 are realized, such that various programs (OS, application program, and the like) stored in the auxiliary storage unit are loaded in the main storage unit and CPU executes the programs. CPU executes the programs to realize the functions of the face detection unit 3, the glaze intensity obtaining unit 4, and the image correction unit 5. It is possible that the face detection unit 3, the glaze intensity obtaining unit 4, and the image correction unit 5 are formed as a dedicated chip. Then, each function unit included in the image correction apparatus 1 will be described.

Image Input Unit

The image input unit 2 functions as an interface which inputs the original image data to the image correction apparatus 1. The image input unit 2 inputs the original image data from the outside of the image correction apparatus 1 to the image correction apparatus 1. It is possible that the image input unit 2 is formed by any already-existing technology which inputs the original image data to the image correction apparatus 1.

For example, it is possible that the original image data is inputted to the image correction apparatus 1 through a network (for example, local area network or Internet). In this case, the image input unit 2 is formed by the network interface. It is also possible that the original image data is inputted to the image correction apparatus 1 from a digital camera, a scanner, a personal computer, or a recording device such as the hard disk drive. In this case, the image input unit 2 is formed according to a standard in which the image correction apparatus 1 is connected to the digital camera, the personal computer, or the recording device while data communication can be made. Examples of the standard include wired connection such as USB (Universal Serial Bus) and SCSI (Small Computer System Interface) and wireless connection such as Bluetooth. It is also possible that the original image data recorded in a recording medium is inputted to the image correction apparatus 1. Examples of the recording medium include various flash memories, floppy-disk (registered trademark), CD (Compact Disk), and DVD (Digital Versatile Disc, or Digital Video Disc). In this case, the image input unit 2 is formed by a device (for example, a flash memory reader, a floppy-disk drive, a CD drive, and a DVD drive) which reads the data from the recording medium.

It is also possible that the taken image is inputted as the original image data to the image correction apparatus 1 while the image correction apparatus 1 is incorporated into an image pickup device such as the digital camera or various devices such as PDA (Personal Digital Assistant) and a mobile phone. In this case, it is possible that the image input unit 2 is formed by CCD (Charge-Coupled Devices) or a CMOS (Complementary Metal-Oxide Semiconductor) sensor, or it is possible that the image input unit 2 is formed as the interface which inputs the original image data taken by CCD or the CMOS sensor to the face detection unit 3. Further, it is possible that the image, inputted as the output data to an image output device such as a printer and a display, is inputted as the original image data to the image correction apparatus 1 while the image correction apparatus 1 is incorporated into the image output device. In this case, the image input unit 2 is formed by a device which converts the original image data inputted to the image output device into the data which can be dealt with by the image correction apparatus 1.

It is possible that the image input unit 2 is formed so as to be provided for the plural cases described above.

Face Detection Unit

The face detection unit 3 detects the person's face from the original image to specify face information indicating a position, a size, and the like of the detected face. In the face detection unit 3, for example, it is possible that the face is detected by template matching in which a reference template corresponding to an outline of the whole of the face is used. In the face detection unit 3, it is also possible that the face is detected by the template matching based on constituents (eyes, nose, ears, and the like) of the face. In the face detection unit 3, it is also possible that a vertex of a head and the like is detected by a chroma key process to detect the face based on the vertex. In the face detection unit 3, it is also possible that a domain near the skin color is detected and the domain is detected as the face. In the face detection unit 3, it is also possible that a neural network is used to perform learning by a teacher signal and the domain like the face is detected as the face. In the face detection unit 3, it is also possible that the face detection process is realized by applying any already-existing technology.

When the faces of the plural persons are detected from the original image, the face which is of the process target is determined according to a particular reference. The particular reference means the size of the face, orientation of the face, the position of the face in the image, and the like.

Glaze Intensity Obtaining Unit

The glaze intensity obtaining unit 4 first obtains high-brightness intensity for each of the original image. The high-brightness intensity means a value indicating a brightness height of the pixel having a predetermined threshold (for example, a glaze threshold t in Equation 1). For example, the high-brightness intensity is computed in each pixel based on Equation 1.

$$T=(Vs-t)/(1-t) \ [Vs \geq t]$$
$$T=0 \ [Vs<t] \quad \text{[EQUATION 1]}$$

where

T: high-brightness intensity (0 to 1)

Vs: brightness in original image (0 to 1)

t: glaze threshold (arbitrary numerical values not more than 1)

It is possible that the glaze threshold is given by a designer or a user, or it is possible that the glaze threshold is set based on information obtained from original image. For example, it is possible that the glaze threshold is set based on a statistical value (center of gravity, average, mode, and the like) of the brightness of the whole of the original image or a face part (face part shown by the face information obtained by the face detection unit 3) of the original image. Further, for example, it is also possible that the glaze threshold in which an area of a high-brightness domain (domain formed by the pixel having the high-brightness intensity more than "0") becomes an appropriate value is determined by feedback of the area of the high-brightness domain. However, in this case, it is necessary to previously set the appropriate area value (domain) of the high-brightness.

Then, the glaze intensity obtaining unit 4 obtains (computes) the glaze intensity in each pixel based on the obtained high-brightness intensity. The glaze intensity means the value given to the estimated pixel in which the glaze is generated. For example, the glaze intensity ranges from 0 to 1. In the following description, the glaze is strongly generated as the glaze intensity becomes closer to 1, and the glaze is weakly generated as the glaze intensity becomes closer to 0. Namely, the correction process is required as the glaze intensity becomes higher, and the correction process is not required to much as the glaze intensity becomes lower. Therefore, the image correction apparatus 1 is configured so that the later-mentioned correction process is not performed to the pixel in which the glaze intensity is "0", and thereby the process time can be decreased while accuracy of the correction process is maintained (namely, while natural correction process is realized).

The glaze intensity obtaining unit 4 obtains the glaze intensity based on the face information and the high-brightness intensity which are obtained by the face detection unit 3. Examples of the process which can be performed when the glaze intensity obtaining unit 4 obtains the glaze intensity will be described below.

First Obtaining Process

In a first obtaining process, the glaze intensity obtaining unit 4 obtains skin color intensity of each pixel in the original image and obtains the glaze intensity of each pixel based on the skin color intensity and the high-brightness intensity.

Figure 2:
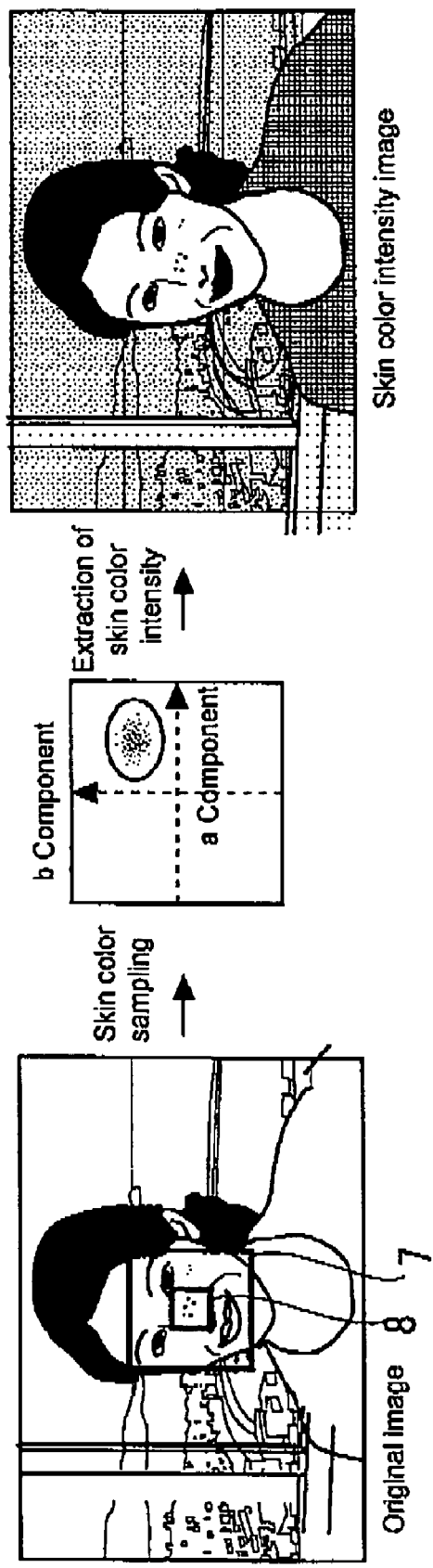
FIG. 2 schematically shows a process of obtaining skin color intensity.
Figure 3:
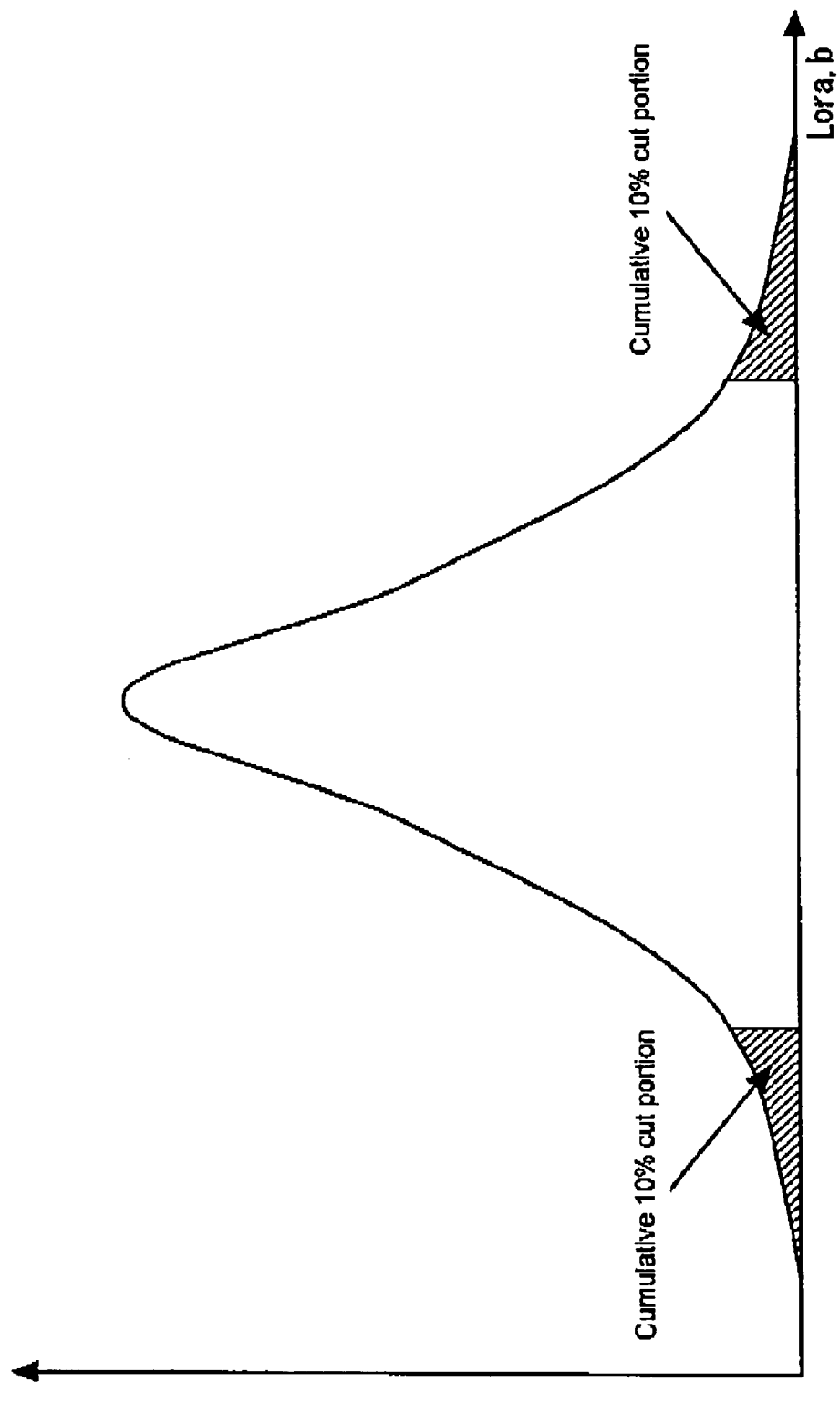
FIG. 3 shows an example of a histogram of a skin color component.

The skin color intensity will first be described. FIG. 2 schematically shows the process of obtaining skin color intensity, FIG. 3 shows an example of a histogram of a skin color component used in obtaining the skin color intensity. The skin color intensity means the value indicating a degree of skin color in each pixel. For example, the design is constructed so that the color of the pixel becomes close to the skin color as the skin color intensity is higher and the color of the pixel becomes far away from the skin color as the skin color intensity is lower.

Then, an example of the process of obtaining the skin color intensity will be described. In the skin color intensity obtaining process, the glaze intensity obtaining unit 4 specifies a face rectangle 7 based on the face information obtained by the face detection unit 3. The face rectangle 7 has a rectangular shape indicating the domain of the face detected by the face detection unit 3. Then, the glaze intensity obtaining unit 4 specifies a sampling domain 8 based on the specified face rectangle 7. The sampling domain 8 is the domain in which the skin color of the person (subject) whose face is detected by the face detection unit 3 is sampled. The sampling domain 8 is specified by the value in which a central coordinate of the face rectangle 7 and a width and height of the face rectangle 7 are multiplied by a constant (for example, values smaller than 1). It is possible that the sampling domain 8 is specified by other methods. It is desired that the sampling domain 8 is set so as not to include the domain having the color clearly different from the skin color.

Then, the glaze intensity obtaining unit 4 samples the pixel value (color component value) in the sampling domain 8. The glaze intensity obtaining unit 4 forms the histogram shown in FIG. 3 based on the sampled color component value. In FIG. 3, the histogram formed based on an Lab color space is shown as an example. When the histogram is formed, the glaze intensity obtaining unit 4 cuts upper and lower 10%-components (oblique lines in FIG. 3) in a horizontal axis (value of L, a or b). The value of 10% is changed by the designer or the user as appropriate. Then, the glaze intensity obtaining unit 4 computes a standard deviation and the center of gravity in the sampling domain 8 by using the L*a*b values of a portion in which the histogram of the skin color component is cut. The glaze intensity obtaining unit 4 computes the skin color intensity in each pixel of the original image by Equation 2 in which the six computed values are used. A skin color intensity image shown in FIG. 2 is the image which is expressed such that the skin color intensity is given as the pixel value.

$$\text{Skin color intensity} = \exp\left\{-\left[\left(\frac{L'-L}{W_L}\right)^2 + \left(\frac{a'-a}{W_a}\right)^2 + \left(\frac{b'-b}{W_b}\right)^2\right]\right\} \quad \text{[EQUATION 2]}$$

where

L',a',b': each center of gravity of Lab value in sampling domain $W_L, W_a, W_b$: standard deviation of Lab value in sampling× constant In forming the histogram of the skin color component, since the cumulative 10%-components are cut from the both ends of the horizontal axis in FIG. 3, a noise component can be removed to more correctly obtain a distribution of the skin color component. The noise component means the information on the pixel mainly having the color component except for the skin color like nares and eyes in the sampling domain 8. Even if the color component except for the skin color such as the nares and the eyes is included in the sampling domain 8, the information on the nares and the eyes can be deleted by the process.

The glaze intensity obtaining unit 4 computes the glaze intensity by multiplying the high-brightness intensity by the skin color intensity in each pixel.

Second Obtaining Process

In a second obtaining process, the glaze intensity obtaining unit 4 specifies a skin domain of the subject (hereinafter referred to as "skin domain") in the original image and obtains the glaze intensity of each pixel based on the skin domain and the high-brightness intensity.

Figure 4:
FIG. 4 shows an example of a skin domain.

A method of specifying the skin domain will be described below. FIG. 4 shows an example of the skin domain. In FIG. 4, a white portion shows the skin domain, and the pixel included in the white portion has "1". In FIG. 4, a black portion shows the domains except for the skin domain, and the pixel included in the black portion has "0". The glaze intensity obtaining unit 4 specifies the pixel having the skin color in the original image and specifies the skin domain formed by the pixels. At this point, it is possible that the skin color is previously defined by the designer or the user, or it is possible that the skin color is defined by the statistical value based on the pixel values in the sampling domain 8 described in the first obtaining process. It is possible that the glaze intensity obtaining unit 4 obtains the skin color intensity described in the first obtaining process in each pixel and sets the threshold for the skin color intensity to specify the skin domain. The glaze intensity obtaining unit 4 gives the value of "1" to the pixels of the specified skin domain and gives the value of "0" to the pixels of the domains except for the specified skin domain, which allows the skin domain to be distinguished from other domains.

In specifying the skin domain, it is also possible that the glaze intensity obtaining unit 4 removes the isolated black domain. Specifically, it is possible that the glaze intensity obtaining unit 4 replaces other small domains surrounded by the skin domain with the skin domain. Elements (eyes, nares, mouth, and the like) of the face, a pimple, wrinkles, and the like can be specified as the skin domain by realizing this process.

Then, the glaze intensity obtaining unit 4 obtains the high-brightness intensity as the glaze intensity only for the pixel included in the skin domain. This process can be realized by multiplying the high-brightness intensity by the value indicating whether the domain is the skin domain or not (the above value of "1" or "0") in each pixel. It is also possible that, before obtaining the high-brightness intensity, the glaze intensity obtaining unit 4 specifies the skin domain to compute the high-brightness intensity only for the pixels included in the skin domain.

Third Obtaining Process

In a third obtaining process, the glaze intensity obtaining unit 4 specifies the estimated domain in which the face of the subject exists in the original image (hereinafter referred to as "face domain") and obtains the glaze intensity of each pixel based on the face domain and the high-brightness intensity.

A method of specifying the face domain will be described. FIG. 5 shows an example of the face domain. In FIG. 5, the white portion shows the face domain, and the pixel included in the white portion has "1". In FIG. 5, the black portion shows the domains except for the face domain, and the pixel included in the black portion has "0". The glaze intensity obtaining unit 4 specifies the face domain according to the face information obtained by the face detection unit 3. For example, the glaze intensity obtaining unit 4 may specify the face domain shown in FIG. 5A by determining the position, the width, and the height of the rectangle according to the position and the size of the face. Further, the glaze intensity obtaining unit 4 may specify the face domain shown in FIG. 5B by determining the center or a radius of a circle or an ellipse according to the position and the size of the face. The glaze intensity obtaining unit 4 gives the value of "1" to the pixels of the specified face domain and gives the value of "0" to the pixels of the domains except for the specified face domain, which allows the face domain to be distinguished from other domains.

Figure 5C:
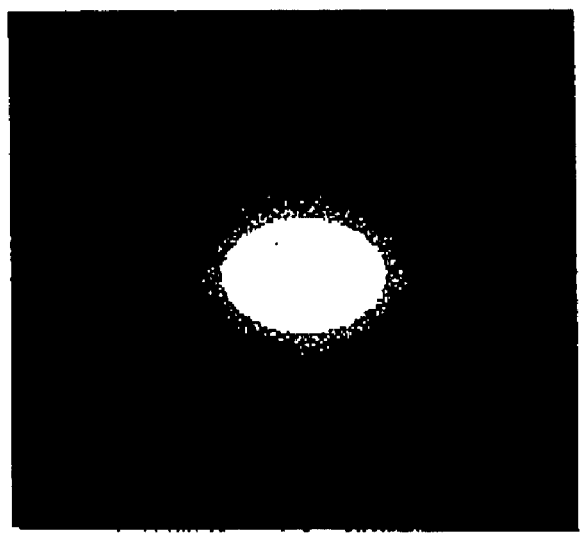
FIGS. 5A-5C show examples of face domains.
Figure 5B:
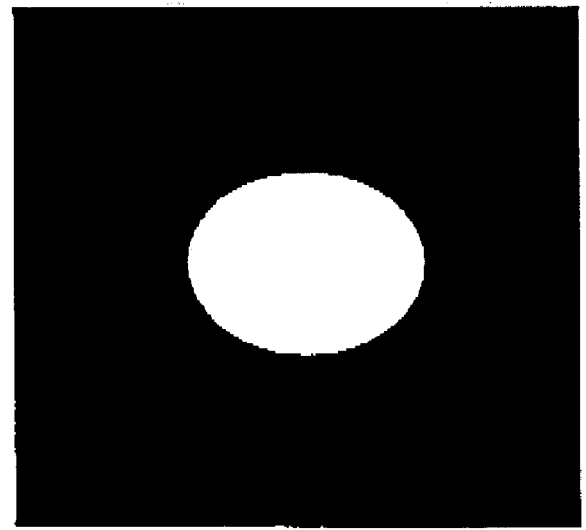
Figure 5A:
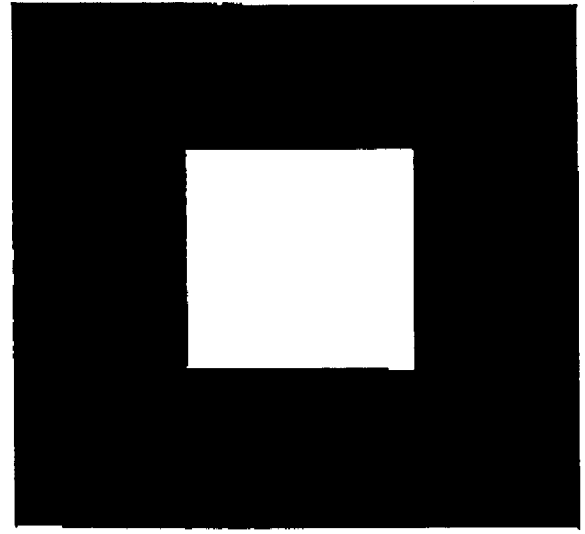

It is also possible that the glaze intensity obtaining unit 4 gives the value (in the example, a decimal ranging from 0 to 1) between the value indicating the face domain and the values indicating other domains by blurring a boundary between the specified face domain and other domains (see FIG. 5C).

Then, the glaze intensity obtaining unit 4 obtains the high-brightness intensity as the glaze intensity only for the pixel included in the face domain. This process can be realized by multiplying the high-brightness intensity by the value indicating whether the domain is the face domain or not (the above value of "1" or "0") in each pixel. In the case where the boundary between the specified face domain and other domains is blurred as shown in FIG. 5C, it is also possible that the glaze intensity obtaining unit 4 computes the glaze intensity by multiplying the value (ranges from "0" to "1") obtained in obtaining the face domain by the high-brightness intensity. It is also possible that, before obtaining the high-brightness intensity, the glaze intensity obtaining unit 4 specifies the face domain to compute the high-brightness intensity only for the pixels included in the face domain.

Fourth Obtaining Process

In a fourth obtaining process, the glaze intensity obtaining unit 4 specifies the estimated domain in which the glaze of the subject face is generated in the original image (hereinafter referred to as "glaze estimated domain") and obtains the glaze intensity of each pixel based on the glaze estimated domain and the high-brightness intensity.

Figure 6:
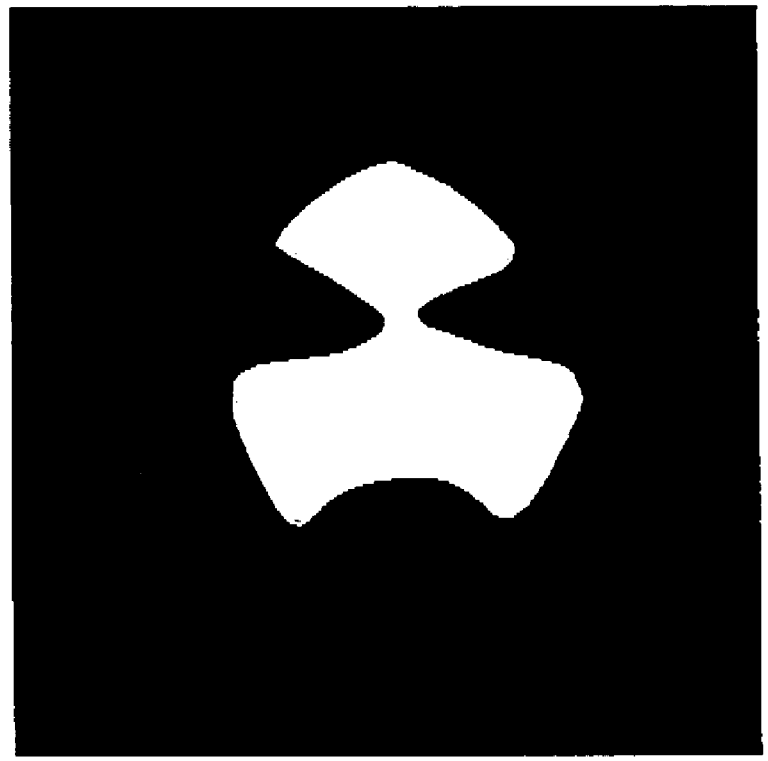
FIG. 6 shows an example of a glaze estimated domain.

A method of specifying the glaze estimated domain will be described. FIG. 6 shows an example of the glaze estimated domain. In FIG. 6, the white portion shows the glaze estimated domain, and the pixel included in the white portion has "1". In FIG. 6, the black portion shows the domains except for the glaze estimated domain, and the pixel included in the black portion has "0". For example, the glaze intensity obtaining unit 4 can specify the glaze estimated domain by using the face information obtained by the face detection unit 3 and a glaze template.

The glaze template means the template which extracts domain where the glaze is easy to generate in the person face. For example, the glaze template has the shape similar to the glaze estimated domain (see FIG. 6). It is also possible that the glaze template extracts the domain including the so-called T zone (a forehead and the domain from the forehead to the tip of the nose) of the subject, the sides of the nose, cheeks, and the like. It is desirable that the glaze template does not extract the domain including the eyes and a lip. The glaze template is the data which is previously given to the glaze intensity obtaining unit 4 by the designer or the user. The glaze intensity obtaining unit 4 determines the position to which the glaze template is applied in the original image according to the face information. Specifically, for example, the central position of the subject face may be estimated from the face information to determine the position to which the glaze template is applied so that the central position of the subject face matches with the portion corresponding to the forehead center of the glaze template. The glaze intensity obtaining unit 4 may deforms (enlargement, contraction, rotation, and the like) the glaze template according to the face information. For example, in the case where that the face of the subject is large is determined from the face information, the glaze template may be enlarged according to the size of the face. In the case where that the face of the subject is inclined is determined from the face information, the glaze template may be rotated according to the size of the face. Thus, the glaze estimated domain is specified, and the glaze intensity obtaining unit 4 gives the value of "1" to the pixel in the glaze estimated domain. The glaze intensity obtaining unit 4 also gives the value of "0" to the pixels in the domains except for the glaze estimated domain. Therefore, the glaze intensity obtaining unit 4 distinguishes the glaze estimated domain from other domains.

Then, the glaze intensity obtaining unit 4 obtains the high-brightness intensity as the glaze intensity only for the pixel included in the glaze estimated domain. This process can be realized by multiplying the high-brightness intensity by the value indicating whether the domain is the glaze estimated domain or not (the above value of "1" or "0") in each pixel. It is also possible that, before obtaining the high-brightness intensity, the glaze intensity obtaining unit 4 specifies the glaze estimated domain to compute the high-brightness intensity only for the pixels included in the glaze estimated domain.

Fifth Obtaining Process

In a fifth obtaining process, the glaze intensity obtaining unit 4 specifies the estimated domain in which the eyes and the mouth of the subject exist in the original image (hereinafter referred to as "eyes and mouth domain"), in the original image and obtains the glaze intensity of each pixel based on the eyes and mouth domain and the high-brightness intensity.

A method of specifying the eyes and mouth domain will be described. FIG. 7 shows an example of the eyes and mouth domain. In FIG. 7, the black portion shows the eyes and mouth domain, and the pixel included in the black portion has "1". In FIG. 7, the white portion shows the domains except for the eyes and mouth domain, and the pixel included in the white portion has "0". The glaze intensity obtaining unit 4 can specify the eyes and mouth domain by using the face information obtained by the face detection unit 3 and an eyes and mouth template.

Figure 7B:
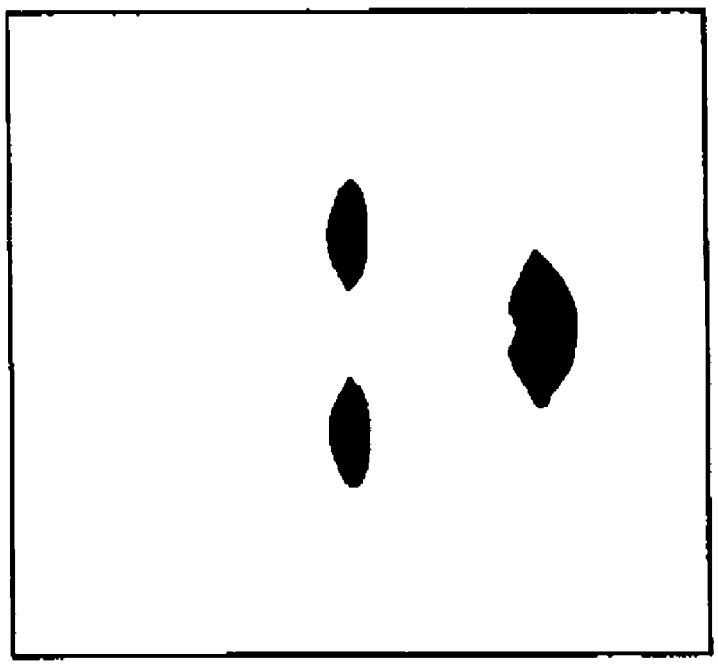
FIGS. 7A-7B show examples of eye and mouth domains.
Figure 7A:
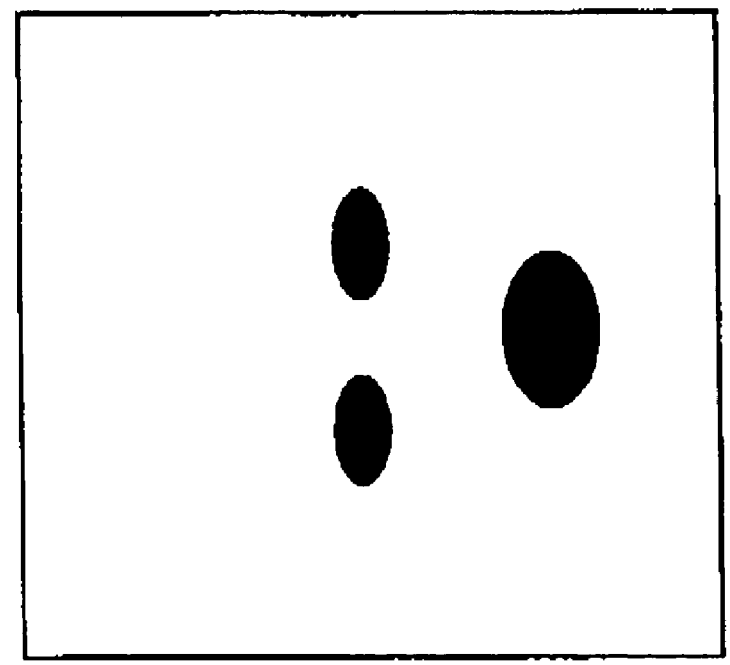

The eyes and mouth template is the template which masks the eyes and mouth domain in the person's face. The eyes and mouth template has the same shape as for the eyes and mouth domain (see FIG. 7). It is also possible that the eyes and mouth template is formed so that three masks of the eyes and the mouth in the subject are integrated. In this case, in the eyes and mouth template, the position and a degree of deformation are determined according to the position and the size of the subject face. In the eyes and mouth template, it is also possible that the right eye template, the left eye template and the mouth template are independently formed. In this case, in the eyes and mouth template, the positions are respectively determined according to the positions of the left eye, the right eye, and the mouth which are estimated from the subject face. At this point, it is also possible that the kind and the degree of the deformation such as the magnification and the rotation are determined in each template. It is also possible that the eyes and mouth template is formed in the ellipse or the rectangle, or it is also possible that the eyes and mouth template is formed in a geometrical shape which bears a resemblance to the shape of the eye or the mouth. FIG. 7A shows an example of the eyes and mouth domain specified by the elliptical template, and FIG. 7B shows an example of the eyes and mouth domain specified by the geometrical template which bears a resemblance to the shape of the eye or the mouth.

Thus, the eyes and mouth template is specified, and the glaze intensity obtaining unit 4 gives the value of "0" to the pixel in the specified eyes and mouth domain. The glaze intensity obtaining unit 4 also gives the value of "1" to the pixels in the domains except for the eyes and mouth domain. Therefore, the glaze intensity obtaining unit 4 distinguishes the eyes and mouth domain from other domains.

Then, the glaze intensity obtaining unit 4 obtains the high-brightness intensity as the glaze intensity only for the pixels included in the domains except for the eyes and mouth domain. This process can be realized by multiplying the high-brightness intensity by the value indicating whether the domain is the eyes and mouth domain or not (the above value of "0" or "1") in each pixel. It is also possible that, before obtaining the high-brightness intensity, the glaze intensity obtaining unit 4 specifies the eyes and mouth domain to compute the high-brightness intensity only for the pixels included in the eyes and mouth domain. The above is the description of the fifth obtaining process.

The glaze intensity obtaining unit 4 obtains the glaze intensity of each pixel by performing any one of the first to fifth obtaining processes. It is also possible that the glaze intensity obtaining unit 4 gives the glaze intensity of "0" to the pixel in which the glaze intensity is not obtained after obtaining the glaze intensity by performing any one of the first to fifth obtaining processes.

It is also possible that the glaze intensity obtaining unit 4 obtains the glaze intensity by combining the first to fifth obtaining processes. For example, in the combination of the first obtaining process and any one of other obtaining processes, it is possible that the glaze intensity is computed only for the pixel (in the case of the eyes and mouth domain, the pixel not included in the specified domain) included in the domain specified in any one of other obtaining processes by multiplying the high-brightness intensity by the skin color intensity. In the combination of the first obtaining process and the third obtaining process, it is possible to construct the design so that the boundary between the face domain and other domains is blurred.

In the above descriptions, the value of "1" is given to the pixel included in the predetermined domains (skin domain, face domain, the glaze generation domain, domains except for the eyes and mouth domain, and the like). However, it is not necessary that the pixel included in the predetermined domain is not restricted by the specific value of "1". The pixel included in the predetermined domains is mounted and designed with other values as long as the same result is obtained.

Image Correction Unit

The image correction unit 5 performs the image correction process to the original image according to the glaze intensity of each pixel. At this point, the image correction unit 5 performs the image correction process according to the following first correction process or second correction process. The first correction process and second correction process will be described below.

First Correction Process

Figure 8:
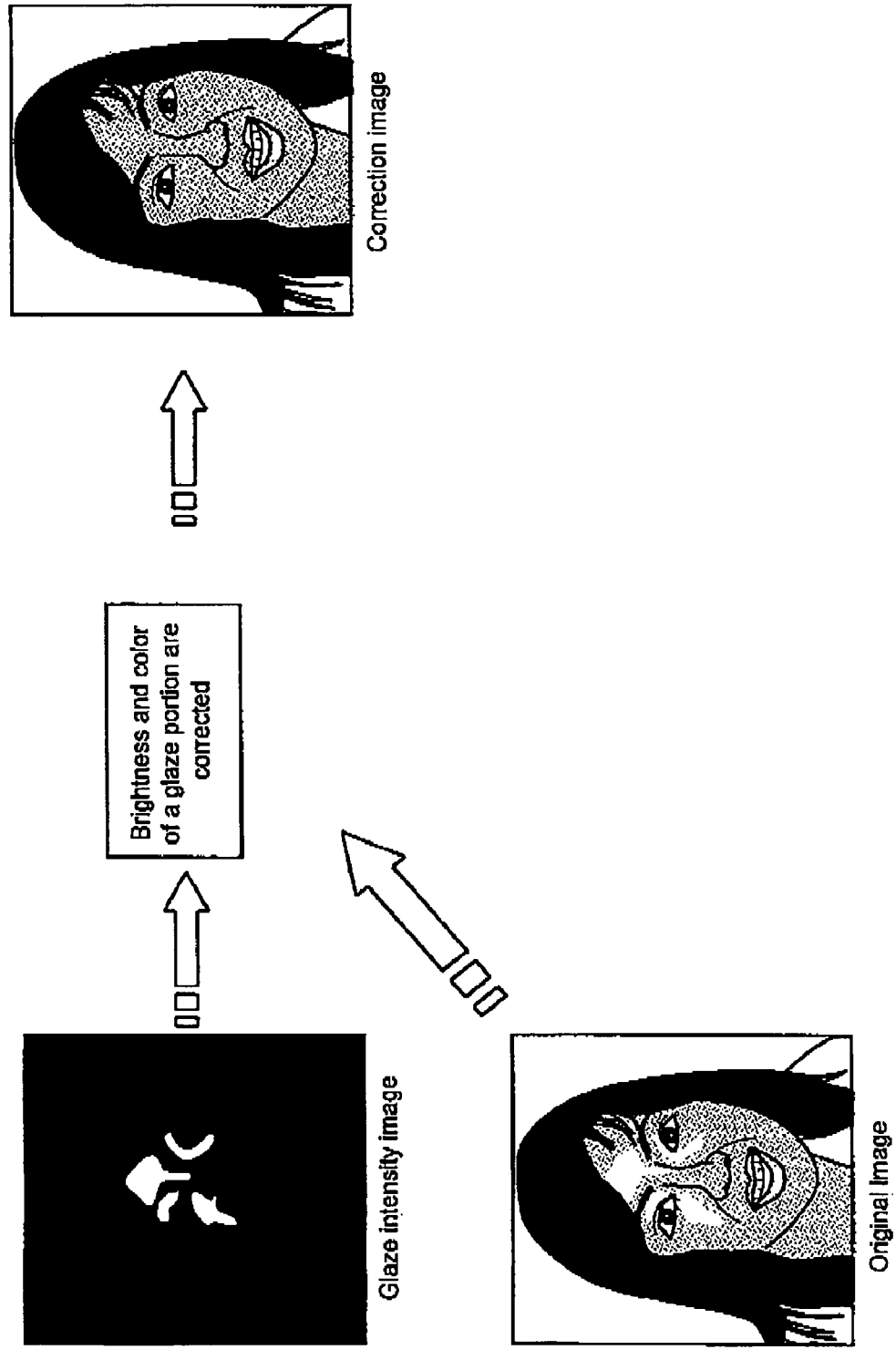
FIG. 8 shows an outline of a first correction process.

FIG. 8 shows an outline of the first correction process. In the first correction process, the image correction unit 5 produces a correction image by using the glaze intensity and the original image. Specifically, the image correction unit 5 performs the process to each pixel according to Equation 3 to compute the brightness in the correction image (post-correction brightness v). The glaze intensity image shown in FIG. 8 is the image in which the value of the glaze intensity in each pixel is expressed as a gray scale image.

$$V = Vs(1-T) + p \cdot Vs \cdot T \quad \text{[EQUATION 3]}$$

where

V: post-correction brightness

Vs: brightness of original image

T: glaze intensity (0 to 1)

p: glaze correction coefficient (arbitrary numerical values not more than 1)

The image correction unit 5 computes the value, which is strongly affected by a glaze correction coefficient p as the glaze intensity becomes higher (stronger), as the post-correction brightness by using Equation 3. On the other hand, the image correction unit 5 computes the value close to the brightness of the original image as the post-correction brightness, while the value is not affected by the glaze correction coefficient p as the glaze intensity becomes weaker (lower). Because the glaze correction coefficient p is an arbitrary numerical value not more than "1", the post-correction brightness of the pixel in which the glaze intensity is high is computed as the value lower than the brightness of the original image. Thus, the image in which the brightness of the glaze portion is restricted can be obtained. It is possible that the glaze correction coefficient p is arbitrarily determined as the value not more than "1" by the designer or the user.

In Equation 3, the post-correction brightness is computed by using the brightness of each pixel in the original image. However, it is possible that the value of each post-correction color component is computed by each color component of each pixel in the original image using the equation similar to Equation 3. Specifically, for example in the case where the process is performed based on an RGB color space, the post-correction brightness V in Equation 3 is replaced with the values such as Vr, Vg, and Vb of the post-correction color components, and the brightness of the original image Vs in Equation 3 is replaced with the values such as Vsr, Vsg, and Vsb of the color components of the original image. At this point, in the value of p (the glaze correction coefficient), it is also possible that the different values are set like pr, pg, and pb according to each color component. In addition to the RGB color space, it is also possible that the process is performed according to a HSV color space or the Lab color space.

Second Correction Process

Figure 9:
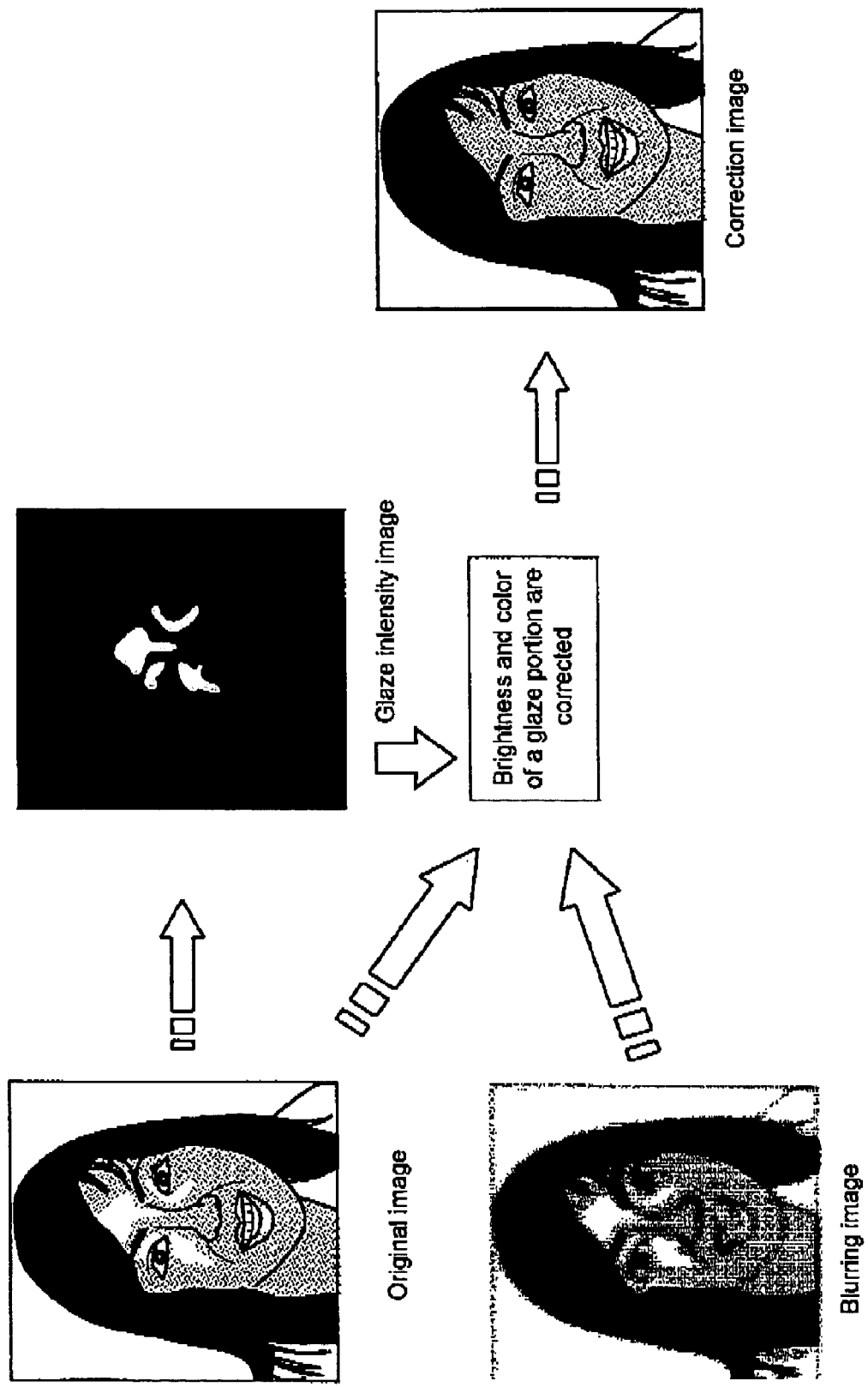
FIG. 9 shows the outline of a second correction process.

FIG. 9 shows the outline of the second correction process. In the second correction process, the image correction unit 5 produces the correction image by using the glaze intensity, the blurring image, and the original image. Specifically, the image correction unit 5 performs the process to each pixel according to Equation 4 to compute the brightness (post-correction brightness v) in the correction image. The glaze intensity image shown in FIG. 9 is the image similar to the glaze intensity image shown in FIG. 8.

$$V = Vs(1-T) + p \cdot V_{smooth} \cdot T \quad \text{[EQUATION 4]}$$

where

V: post-correction brightness

Vs: brightness of original image $V_{smooth}$: brightness of blurring image of original image T: glaze intensity (0 to 1)

p: glaze correction coefficient (arbitrary numerical values not more than 1)

In Equation 4, brightness Vsmooth is used in computing the post-correction brightness v. The brightness Vsmooth is obtained by performing the blurring process to the original image. The brightness Vsmooth can be obtained by applying a moving average filter or a weighted average filter (including Gaussian filter) to the original image. It is possible that this process is performed by the image correction unit 5, or it is possible that this process is performed by other function units (not shown). The case in which the image correction unit 5 performs the blurring process will be described below.

In the process according to Equation 4, the brightness, which is strongly affected by the brightness Vsmooth in the case where the blurring is performed to the original image, is computed for the pixel in which the glaze intensity is higher. Therefore, unlike the case of Equation 3, the correction is performed by using the brightness Vsmooth, i.e. the value in which the glaze portion is smoothed. Accordingly, when compared with Equation 3, the image correction is realized more naturally.

In the process according to Equation 4, the brightness Vsmooth is multiplied by the glaze correction coefficient p. However, it is possible that the image correction unit 5 is formed such that the glaze correction coefficient p is not used (namely, such that the value of p is process as "1").

In computing the brightness Vsmooth in each pixel, it is possible that the image correction unit 5 performs the blurring process only for the pixel having the color close to the skin color. For example, this process can be realized by computing the skin color intensity for each pixel. In performing the blurring process, the above configuration enables the colors except for the skin color to be prevented from blurring to the skin color pixel adjacent to the pixel having the color except for the skin color like hair and the eyes. Therefore, the brightness Vsmooth can be computed based on only the skin color. Accordingly, the post-correction brightness V finally obtained can be appropriately obtained based on only the skin color while affected by the hair and the eyes.

In Equation 4, the post-correction brightness is computed by using the rightness of each pixel in the original image. However, as with the first correction process, it is also possible that the value of each post-correction color component is computed by each color component of each pixel in the original image using the equation similar to Equation 4. Specifically, for example in the case where the process is performed based on the RGB color space, as with the first correction process, the post-correction brightness V or the original image brightness Vs in Equation 4 are replaced with the color component values such as Vr, Vg, Vb, Vsr, Vsg, and Vsb. Further, in the case of the second correction process, the brightness Vsmooth in Equation 4 is replaced with the color component values such as Vsmoothr, Vsmoothg, and Vsmoothb. At this point, in the value of p (the glaze correction coefficient), it is also possible that the different values are set like pr, pg, and pb according to each color component. In addition to the RGB color space, it is also possible that the process is performed according to the HSV color space or the Lab color space. The above is the description of the second correction process.

The image correction unit 5 performs the first correction process or the second correction process, which allows the image correction unit 5 to obtain the post-correction brightness V for all the pixels to produce the correction image formed by the brightness V.

Image Output Unit

The image output unit 6 functions as the interface which outputs the data of the correction image produced by the image correction unit 5 to the outside of the image correction apparatus 1. The image output unit 6 outputs the correction image data from the image correction apparatus 1 to the outside of the image correction apparatus 1. It is possible that the image output unit 6 is formed by any already-existing technology which outputs the correction image data from the image correction apparatus 1.

For example, it is possible that the correction image data is outputted from the image correction apparatus 1 through the network. In this case, the image output unit 6 is formed by the network interface. It is also possible that the correction image data is outputted to other information processing apparatuses such as the personal computer or the recording apparatus. In this case, the image output unit 6 is formed according to the standard in which other information processing apparatuses such as the personal computer or the recording apparatus is connected to the image correction apparatus 1 while the data communication can be conducted. It is also possible that the correction image data is outputted to (written in) the recording medium. In this case, the image output unit 6 is formed by the apparatus (for example, flash memory writer, floppy-disk drive, CD-R drive, and DVD-R drive) in which the data is written in the recording apparatus or the recording medium.

Further, it is also possible that while the image correction apparatus 1 is incorporated in the image output apparatus such as the printer or the display, the correction image data is output as the image data printed out or the image data displayed on the display. In this case, the image output unit 6 is formed by the apparatus which converts the correction image data generated by the image correction apparatus 1 into the data dealt with by the image output apparatus such as the printer or the display, It is also possible that the image output unit 6 is formed so as to be compatible with the above plural cases.

OPERATION EXAMPLE

Figure 10:
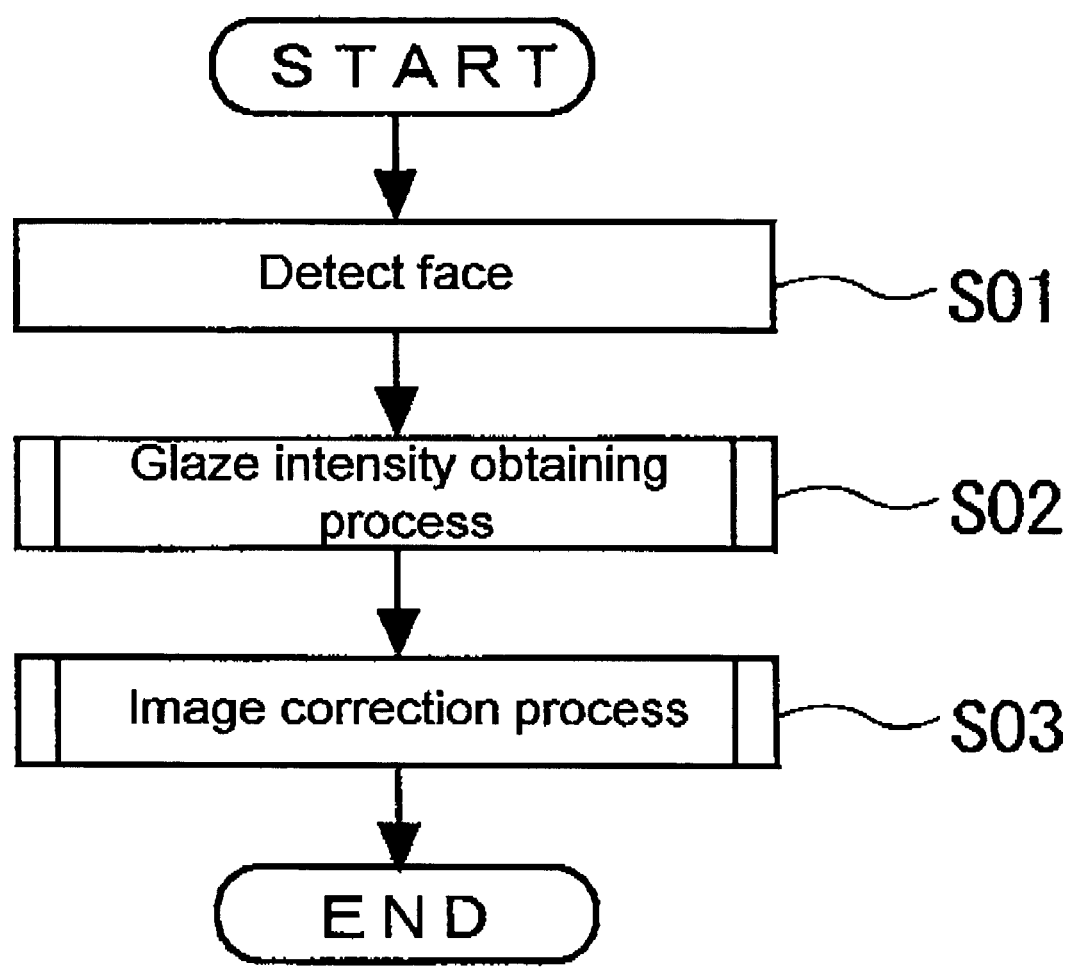
FIG. 10 shows a flowchart of an operation example of an image correction apparatus.

FIG. 10 shows a flowchart of an operation example of the image correction apparatus 1. Referring to FIG. 10, an operation example of the image correction apparatus 1 will be described. First the face detection unit 3 detects the person face of the subject from the inputted image (S01), and the face information is obtained. Then, the glaze intensity obtaining unit 4 obtains the glaze intensity of each pixel by performing the glaze intensity obtaining process (S02).

Figure 11:
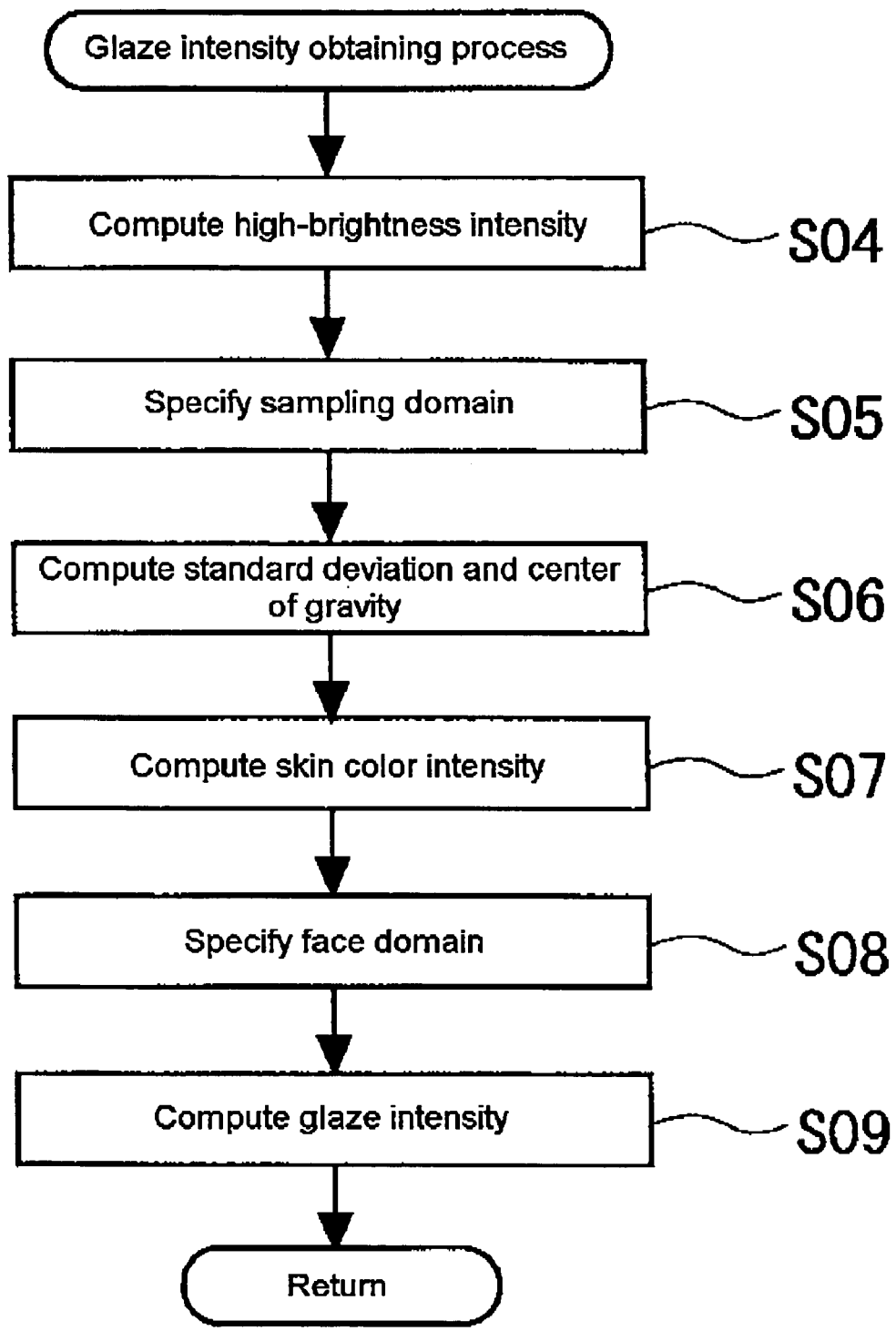
FIG. 11 shows an operation example of the image correction apparatus in a glaze intensity obtaining process.

FIG. 11 shows an operation example of the image correction apparatus 1 in the glaze intensity obtaining process. In FIG. 11, the process of obtaining the glaze intensity by the method in which the first obtaining process and the third obtaining process are combined is shown as an example. Referring to FIG. 11, the glaze intensity obtaining process will be described.

The glaze intensity obtaining unit 4 computes the high-brightness intensity for each pixel in the original image (S04). Then, the glaze intensity obtaining unit 4 specifies the sampling domain 8 based on the face information obtained by the face detection unit 3 (S05), and the glaze intensity obtaining unit 4 obtains the information on the skin color based on the pixel color in the sampling domain 8. Specifically, the standard deviation and the center of gravity are computed for the pixel color in the sampling domain 8 (S06). Then, the glaze intensity obtaining unit 4 computes the skin color intensity of each pixel based on the standard deviation and the center of gravity (S07). The glaze intensity obtaining unit 4 specifies the face domain based on the face information (S08). Then, the glaze intensity obtaining unit 4 computes the glaze intensity of each pixel based on the high-brightness intensity of each pixel, the skin color intensity, and face domain (S09). Thus, the glaze intensity obtaining process is ended.

Now the description is returned to FIG. 10. When the glaze intensity obtaining process is ended, the image correction unit 5 performs the image correction process based on the glaze intensity of each pixel (S03).

Figure 12:
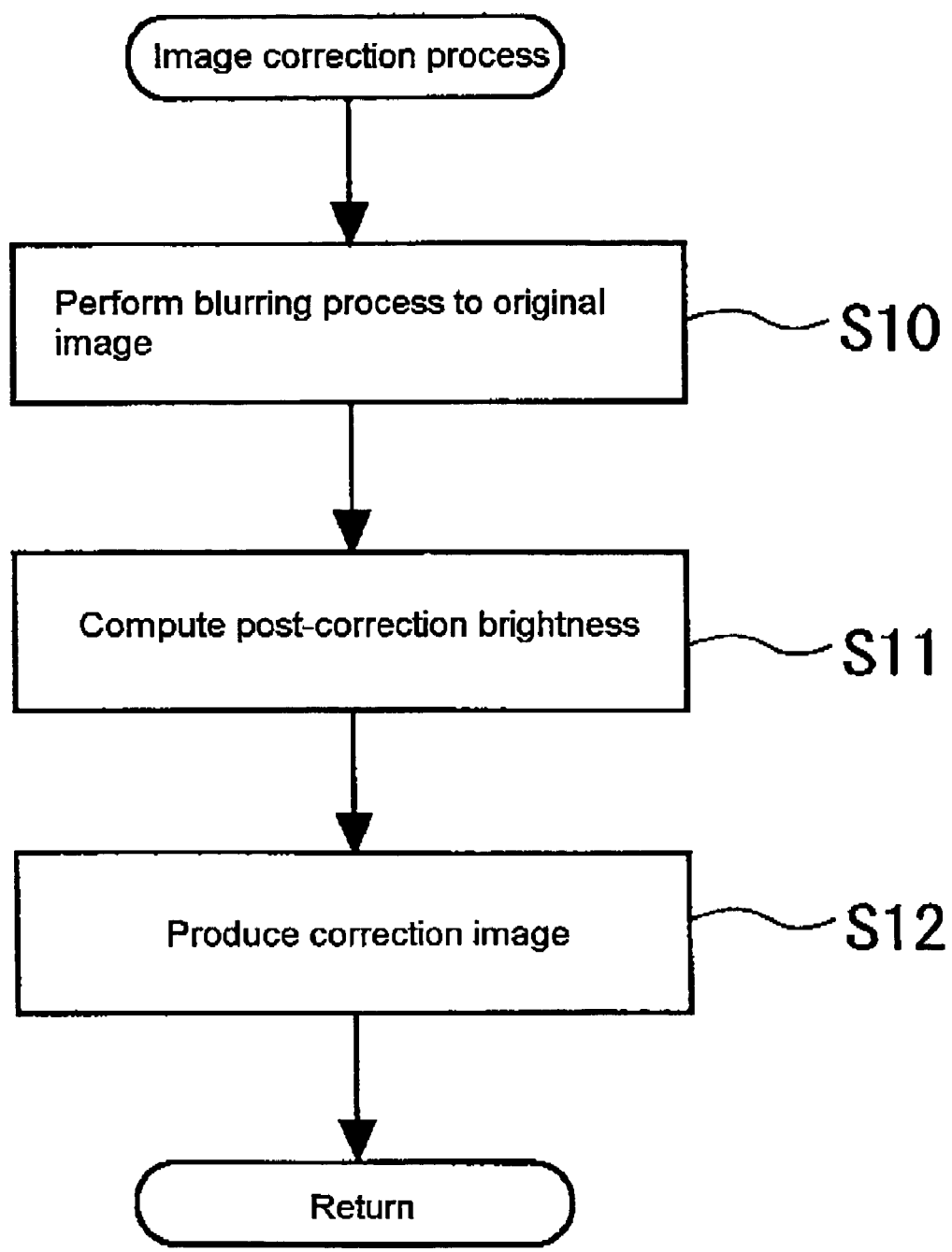
FIG. 12 shows an operation example of the image correction apparatus in an image correction process.

FIG. 12 shows an operation example of the image correction apparatus 1 in the image correction process. In FIG. 12, the process of generating the correction image by the second correction process is shown as an example. Referring to FIG. 12, an example of the image correction process will be described below.

The image correction unit 5 generates a blurring image by performing the blurring process to the original image (S10). Then, the image correction unit 5 computes the post-correction brightness of each pixel by using the original image, the blurring image, and the glaze intensity of each pixel (S11). The image correction unit 5 generates the correction image based on the post-correction brightness (S12). Thus, the image correction process is ended. The image output unit 6 outputs the generated correction image to the outside of the image correction apparatus 1.

Working Effect

According to the image correction apparatus 1, the correction is not simply performed to the high-brightness pixel in the original image, but the correction is performed by computing the glaze intensity based on the subject face information detected by the face detection unit 3. Specifically, for example, the high glaze intensity is given to the high-brightness pixel having the skin color, the high-brightness pixel in which the skin color is strong (skin color intensity is high) in the subject face, the high-brightness pixel in the subject face, the high-brightness pixel of the estimated point in which the glaze exists in the subject face, and the high-brightness pixel of the portion in which the eyes and mouth of the subject are removed, and the image correction is performed according to the glaze intensity. At this point, the performed image correction is the process of decreasing the brightness or the lightness of the pixel. Therefore, the image correction can be performed only to the glaze portion generated in the skin portion of the subject, and the glaze can be removed or reduced. In the image correction according to the glaze intensity, the brightness of the pixel is not uniformly decreased, but the degree of correction is changed according the skin color component or the degree of brightness. Accordingly, the natural correction is realized with no feeling that something is wrong, Modifications It is possible that the glaze intensity obtaining unit 4 or the image correction unit 5 is formed so as to apply the moving average filter or the weighted average filter (including Gaussian filter) to the glaze intensity of each pixel. This configuration suppresses the rapid change in glaze intensity. Therefore, in the image correction unit 5, the natural correction is realized with no feeling that something is wrong. For example, in two adjacent pixels (the pixel having the glaze intensity close to 1 and the pixel having the glaze intensity of 0), when the difference in glaze intensity exists between the pixels, the degrees of image corrections performed are different from each other. In this case, the boundary is visually recognized, which results in the unnatural image correction process. However, when the rapid change in glaze intensity is suppressed in the two adjacent pixels, the generation of the boundary is prevented, which allows the natural image correction to be realized with no feeling that something is wrong.

In the image correction apparatus 1 of the invention, the glaze intensity obtaining unit 4 and the image correction unit 5 are formed as the individual function unit, and the image correction is performed after the glaze intensity is once computed in the pixels of the whole image. It is also possible that the image correction apparatus 1 is formed so that these processes are performed at once. Specifically, in computing the glaze intensity of each pixel, it is possible that the post-correction brightness is computed to the pixel and then the glaze intensity and the post-correction brightness are computed to other pixels. Namely, it is possible that the computations of the glaze intensity and the post-correction brightness are performed as a series of processes to each pixel. Therefore, a resource required for the process can be decreased, and speed-up of the process can be achieved.

Further, it is also possible that the image correction apparatus 1 includes a function unit which detects other subject region instead of the face detection unit 3. For example, it is possible that the image correction apparatus 1 includes the function unit which detects the positions of the eye (pupil), the nares, the forehead, the outline of the face, the lip of the subject independently of the position of the face. It is possible that the function unit is realized by applying any already-existing technology. In this case, the sampling domain 8, the skin domain, the face domain, the glaze estimated domain, the eyes and mouth domain, and the like are specified based on the positions of the regions detected by the function unit. For example, the position of the pupil can be detected applying the technology described in the following paper.

Mayumi Yuasa, Kazuhiro Fukui, and Osamu Yamaguchi "High-accuracy Pupil Detection Based on Integrated Energy Minimization of Pattern and Edge" IEICE Technical Report (2000), Vol. 100, No. 134, pp. 79-84.

Further, it is possible that the face rectangle 7 or the sampling domain 8 is specified by the geometrical shape except for the rectangle.

What is claimed is:

1. An image correction method comprising:
    a step in which a digital computing apparatus detects a predetermined region of a subject from an inputted image;
    a step in which said apparatus computes an intensity value indicating how close a color component of a pixel is to a dominant color component of the detected predetermined region; and
    a step in which said apparatus performs image correction to the pixel such that brightness or lightness of the pixel is decreased, wherein the information processing apparatus determines a degree of correction to be performed to the pixel based on the intensity value and the brightness or lightness of the pixel of the inputted image.

2. An image correction apparatus comprising:
    a detection device configured to detect a predetermined region of a subject from an inputted image;
    an intensity value computing device configured to compute an intensity value indicating how close a color component of a pixel is to a dominant color component of the detected predetermined region; and
    a correction device configured to perform image correction to the pixel such that brightness or lightness of the pixel is decreased, wherein the correction device determines a degree of correction performed to the pixel based on the intensity value and the brightness or the lightness of the pixel of the inputted image.

3. An image correction apparatus according to claim 2, wherein the correction device weakens the degree of correction used to compute a color component close to the color component of the pixel of the inputted image, as the intensity value of the pixel indicates that the color component is farther away from the dominant color component of the predetermined region, and as the brightness or the lightness of the pixel has a lower value, wherein the color component close to the color component of the pixel becomes the color component of the pixel; and
    the correction device strengthens the degree of correction used to compute the color component, as the intensity value of the pixel indicates that the color component is closer to the dominant color component of the predetermined region, and as the brightness or the lightness of the pixel has a higher value, the color component in which the brightness or the lightness is decreased becomes the color component of the pixel.

4. An image correction apparatus according to claim 2, further comprising a blurring device which performs a blurring process to the inputted image, wherein the correction device weakens the degree of correction used to compute the color component close to the color component of the pixel of the inputted image, as the intensity value-of the pixel indicates that the color component is farther away from the dominant color component of the predetermined region, and as the brightness or the lightness of the pixel has a lower value, the color component closer to the color component of the pixel becomes the color component of the pixel; and
    the correction device strengths the degree of correction to compute the color component close to the color component, as the intensity value of the pixel indicates that the color component is closer to the dominant color component of the predetermined region, and as the brightness or the lightness of the pixel has a higher value, the color component closer to the color component of the pixel becomes the color component of the pixel.

5. An image correction apparatus according to claim 4, wherein the blurring device performs the blurring process by using only the pixel having a value indicating that the intensity value is close to the dominant color component of the predetermined region.

6. A computer-readable medium encoded with a computer program which causes a digital computing apparatus to execute the steps of:
    detecting a predetermined region of a subject from an inputted image;
    computing an intensity value indicating how close a color component of each of a plurality of pixels of the inputted image is to a dominant color component of the detected predetermined region; and
    performing image correction to each of the plurality of pixels of the inputted image such that brightness or lightness of each respective pixel is decreased, the performing step determining a degree of correction to be performed to each respective pixel based on the intensity value and the brightness or the lightness of each respective pixel of the inputted image.

7. An image correction method comprising:
    a step in which a digital computing apparatus detects a predetermined region of a subject from an inputted image;
    a step in which said apparatus computes an intensity value indicating how close a color component of a pixel is to a dominant color component of the detected predetermined region; and a step in which said apparatus performs image correction to the pixel such that brightness or lightness is decreased, wherein the information processing apparatus determines a degree of correction performed to the pixel based on a position of the detected predetermined region, the intensity value, and the brightness or the lightness of the pixel of the inputted image.

8. An image correction apparatus comprising:
a detection device configured to detect a predetermined region of a subject from an inputted image;
an intensity value computing device configured to compute an intensity value indicating how close a color component of a pixel is to a dominant color component of the detected predetermined region; and
a correction device configured to perform image correction to the pixel such that brightness or lightness of the pixel is decreased, wherein the correction device determines a degree of correction to be performed to the pixel based on a position of the detected predetermined region, the intensity value, and the brightness or the lightness of each pixel of the inputted image.

9. An image correction apparatus according to claim 8, wherein the correction device weakens the degree of correction used to compute a color component close to the color component of the pixel of the inputted image, as the intensity value of the pixel indicates that the color component is farther away from the dominant color component of the predetermined region, and as the brightness or the lightness of the pixel has a lower value, wherein the color component close to the color component of the pixel becomes the color component of the pixel; and
the correction device strengthens the degree of correction used to compute the color component, as the intensity value of the pixel indicates that the color component is closer to the dominant color component of the predetermined region, and as the brightness or the lightness of the pixel has a higher value, the color component in which the brightness or the lightness is decreased becomes the color component of the pixel.

10. An image correction apparatus according to claim 8, further comprising a blurring device which performs a blurring process to the inputted image,
wherein the correction device weakens the degree of correction used to compute the color component close to the color component of the pixel of the inputted image, as the intensity value-of the pixel indicates that the color component is farther away from the dominant color component which of the predetermined region, and as the brightness or the lightness of the pixel has a lower value, the color component closer to the color component of the pixel becomes the color component of the pixel; and
the correction device strengths the degree of correction to compute the color component close to the color component, as the intensity value of the pixel indicates that the color component is closer to the dominant color component of the predetermined region, and as the brightness or the lightness of the pixel has a higher value, the color component closer to the color component of the pixel becomes the color component of the pixel.

11. An image correction apparatus according to claim 10, wherein the blurring device performs the blurring process by using only the pixel having a value indicating that the intensity value is close to the dominant color component of the predetermined region.

12. An image correction apparatus according to claims 2 or 8, wherein the correction device determines an estimated domain which includes a person's face based on the position of the detected predetermined region, and performs the image correction to each of a plurality of pixels included in the domain, based on the brightness or the lightness of each pixel in the domain.

13. An image correction apparatus according to claims 2 or 8, wherein the correction device determines an estimated domain where glaze is generated on the skin of a person's face based on the position of the detected predetermined region, and performs the image correction to the pixels, included in the domain, based on the brightness or the lightness of each pixel.

14. An image correction apparatus according to claims 2 or 8, wherein the correction device estimates a position of eyes and/or mouth based on the position of the detected predetermined region, and performs the image correction to a plurality of pixels in a domain, except for the eyes and/or mouth, based on the brightness or the lightness of each respective pixel in the domain.

15. An image correction apparatus as in any one of claims 2 or 8, wherein the correction device obtains the degree of correction for the pixel which includes performing a smoothing process on the original image.

16. A computer-readable medium encoded with a computer program which caused a digital computing apparatus to execute the steps of:
detecting a predetermined region of a subject from an inputted image;
computing an intensity value indicating how close a color component of a pixel of a plurality of pixels is to a dominant color component of the detected predetermined region for each pixel of the plurality of pixels; and
performing image correction to each pixel of the plurality of pixels such that brightness or lightness of each respective pixel is decreased, the image correction performing step determining a degree of correction to be performed to each pixel of the plurality of pixels based on a position of the detected predetermined region, the intensity value, and the brightness or the lightness of each pixel of the inputted image.

17. An image correction apparatus comprising:
a detection device configured to detect a predetermined region of a subject from an inputted image;
an intensity obtaining unit configured to determine an intensity value for each of a plurality of pixels in the predetermined region based on a brightness or lightness of each respective pixel, a threshold value and a skin intensity value of each respective pixel; and
a correction unit configured to perform image correction to each respective pixel such that brightness or lightness of the pixel is decreased based on the respective intensity value.

18. An image correction apparatus comprising:
a detection device configured to detect a predetermined region of a subject from an inputted image;
a domain determination unit which determines a domain, where image correction is preformed, based on a position of the predetermined region and the brightness or lightness of each pixel of the inputted image;
an intensity obtaining unit configured to determine an intensity value for each of a plurality of pixels in the predetermined region based on the brightness or lightness of each respective pixel of the inputted image, a threshold value and a skin domain, that is based on skin intensity values of pixels of the inputted image; and
a correction unit configured to perform image correction to each pixel of the domain such that brightness or lightness of each respective pixel of the domain is decreased based on the respective intensity value.

* * * * *